United States Patent
Terasaki et al.

(10) Patent No.: US 6,749,940 B1
(45) Date of Patent: Jun. 15, 2004

(54) MOISTUREPROOF MULTILAYERED FILM

(75) Inventors: Shuji Terasaki, Ibaraki (JP);
Masamichi Akatsu, Ibaraki (JP);
Hisaaki Terashima, Ibaraki (JP);
Yasuhiro Tada, Ibaraki (JP)

(73) Assignee: Kureha Chemical Industry Co., Ltd., Tokyo (JP)

(*) Notice: Subject to any disclaimer, the term of this patent is extended or adjusted under 35 U.S.C. 154(b) by 0 days.

(21) Appl. No.: 10/276,254

(22) PCT Filed: May 26, 2000

(86) PCT No.: PCT/JP00/03383

§ 371 (c)(1),
(2), (4) Date: Jul. 16, 2003

(87) PCT Pub. No.: WO01/89826

PCT Pub. Date: Nov. 29, 2001

(51) Int. Cl.⁷ .......................... B32B 15/08; B32B 18/00; B32B 27/40; B32B 31/14; B32B 31/26

(52) U.S. Cl. ................ 428/425.8; 428/423.1; 428/425.5; 428/446; 428/457; 428/458; 428/469; 156/182; 156/184; 156/297; 156/299; 156/330.9; 156/300; 156/331.7

(58) Field of Search .......................... 428/423.1, 425.8, 428/425.5, 446, 457, 458, 469; 156/182, 184, 297, 299, 330.9, 300, 331.7

(56) References Cited

U.S. PATENT DOCUMENTS

| | | |
|---|---|---|
| 5,498,662 A | 3/1996 | Tanaka et al. |
| 5,552,479 A | 9/1996 | Tanaka et al. |
| 5,656,355 A * | 8/1997 | Cohen .................... 428/138 |
| 5,681,666 A * | 10/1997 | Treger et al. ............ 429/90 |
| 5,900,271 A * | 5/1999 | Misiano et al. .......... 427/8 |
| 6,254,983 B1 * | 7/2001 | Namiki .................... 428/336 |
| 6,413,645 B1 * | 7/2002 | Graff et al. ............. 428/446 |

FOREIGN PATENT DOCUMENTS

| | | |
|---|---|---|
| JP | 3-63127 | 3/1991 |
| JP | 3-161743 | 7/1991 |
| JP | 6-220221 | 8/1994 |
| JP | 7-165942 | 6/1995 |
| JP | 8-300549 | 11/1996 |
| JP | 9-76402 | 3/1997 |
| JP | 9-156019 | 6/1997 |
| JP | 11-100659 | 4/1999 |
| JP | 2000-318081 | 11/2000 |

* cited by examiner

*Primary Examiner*—Vivian Chen
(74) *Attorney, Agent, or Firm*—Leydig, Voit & Mayer, Ltd.

(57) ABSTRACT

A moistureproof multilayer film, including a composite film having a non-moisture absorbing resin layer and a vapor deposited film of an inorganic oxide or a metal formed on at least one side of the non-moisture absorbing resin layer, the multilayer film having such a layer structure where the vapor deposited film surface of the composite film is laminated through an adhesive layer on a vapor deposited film surface of another composite film or a surface of another non-moisture absorbing resin layer, wherein a total number (n) of the deposited films laminated adjacent to the adhesive layer is 2 to 8, and wherein a moisture permeabihty (W; unit: $g/m^2 \cdot day$) as measured under conditions of a temperature of 40° C. and a relative humidity of 100% satisfies a relation represented by equation $W \leq (1/n) \times 0.20$, and a method for producing the moistureproof multilayer film including heat-treating the multilayer film in a hot dry atmosphere having a temperature lower than 140° C. but not lower than 55° C. for at least 10 hours.

19 Claims, 2 Drawing Sheets

MOISTUREPROOF MULTILAYERED FILM

TECHNICAL FIELD

The present invention relates to a moistureproof multilayer film having high moistureproofness, and more particularly to a moistureproof multilayer film suitable for use as a packaging material and a sealing material for food, medicine, electronic components and so on, and to a method for producing the same. The moistureproof multilayer film of this invention can have moistureproofness comparable to a poly(chlorotrifluoroethylene) film and is particularly suitable for use as a packaging film for sealing electronic components such as an electroluminescence element.

BACKGROUND ART

Conventionally, a composite film including a synthetic resin film and a vapor deposited film of an inorganic oxide or a metal formed on a surface of the synthetic resin film is used as a packaging material and a sealing material for food, medicine, electronic components and so on because it has good oxygen gas and water vapor barrier properties, excellent transparency, and, when the vapor deposited film is a silicon oxide thin film or the like, suitability for use in microwave ovens. When synthetic resin films of various types are laminated on one or both sides of a composite film including a vapor deposited film on at least one side thereof, the vapor deposited film can be protected, and various functions such as strength, thermal resistance, heat seal properties can be imparted to the resulting multilayer film.

However, conventional composite films including a vapor deposited film cannot have sufficiently low moisture permeability and thus are not necessarily suitable for use as a packaging film for sealing electronic components which are apt to require high moistureproofness. This problem will be described in detail taking an electroluminescence element (EL element) as an example.

A phenomenon in which a solid luminescent compound (phosphor) converts electric energy into luminescent energy when an electric field is applied thereto is referred to as electroluminescence. Electroluminescence elements can be classified into a thin film type and a dispersion type according to their basic element structure. A thin film type EL element has a luminescent layer of a thin film of a phosphor. A dispersion type EL element has a luminescent layer of a powdery phosphor dispersed in an organic or inorganic binder. An EL element has an element body comprising a luminescent layer sandwiched directly or through insulating layers between a pair of electrodes, and a transparent electrode is used as at least one of the paired electrodes. When the phosphor constituting the luminescent layer absorbs moisture, the luminance (brightness) thereof is considerably lowered. Thus, an EL element generally has such a structure that an EL element body comprising a luminescent layer sandwiched between a pair of electrodes is covered (sealed) with a transparent moistureproof material.

As the moistureproof material for EL elements, poly(chlorotrifluoroethylene) (PCTFE) film or glass substrate has conventionally been used. PCTFE film has the highest moistureproofness in synthetic resin films but is high in cost, and its moistureproofness is considerably decreased when atmospheric temperature exceeds 50° C. Thus, the service life of an EL element sealed with PCTFE film is extremely shortened under high temperature and high moisture conditions. As for glass substrate, there is a limit to reducing the thickness and weight, and it is lacking in flexibility. Also, it is difficult to seal an EL element body only with glass substrate, and it must be used in combination with a moistureproof film having flexibility.

Thus, there has been a demand for development of a moistureproof film having high moistureproofness substitutable for PCTFE film. Some materials, including polyvinylidene chloride and polyvinyl alcohol, have been studied for a resin material substitutable for PCTFE. Synthetic resin films on which a vapor deposited film of an inorganic oxide or a metal is provided have also been studied. However, it has been difficult to develop a moistureproof material having moderate flexibility and high moistureproofness comparable to PCTFE film.

For example, JP-A-H08-300549 discloses a method of improving gas barrier properties of a laminated film comprising at least biaxially stretched plastic film and skin film/adhesive resin layer/flexible film, in which the film having gas barrier properties and provided on the biaxially stretched plastic film is in contact with the adhesive resin layer. The method comprises heating the biaxially stretched plastic film at a temperature between its glass transition point and melting point so that the biaxially stretched plastic film exhibits an elongation and shrinkage in the longitudinal direction (MD) of within 2% and within 5%, respectively. In the above publication, vapor deposited films of inorganic oxides or metals are shown as examples of films having gas barrier properties.

In the method disclosed in the above publication, the elongation or shrinkage of the laminated film is controlled by passing the laminated film, during the heating of the laminated film, between two independently driven rolls A and B while adjusting the rotational speeds of the rolls. More specifically, the circumferential velocity of the roll B is set at 1.02 to 0.95 times that of the roll A so that the laminated film may be heated under tension. In the above method, the heating temperature is preferably the glass transition point plus 70° C. or higher and not higher than the melting point of the biaxially stretched plastic film. In the above disclosure, an example in which a laminated film was brought into contact with heat rolls having a temperature of 230° C. for 1.5 seconds (Example 1), an example in which a laminated film was brought into contact with heat rolls having a temperature of 190° C. for 3.2 seconds (Example 2), and an example in which a laminated film was brought into contact with heat rolls having a temperature of 250° C. for 0.9 seconds (Example 3) are shown. In other examples, laminated films were heated in a heating furnace at 170° C. for 10 minutes (Example 4) and at 210° C. for 2 minutes (Example 5), respectively, while being passed between two independently driven rolls slowly. By the heat treatment, the moisture permeability (as measured by a cup method, under conditions of a temperature of 40° C. and a relative humidity of 90%) of the laminated film was improved from 1.5 g/m².day to 0.6 g/m².day (Example 4). However, the moisture permeability is far inferior to that of PCTFE film (0.03 g/m².day).

Recently, the present inventors found that a moistureproof film having high moistureproofness can be obtained by drying a transparent multilayer film including a layer of a moisture absorbing resin such as polyvinyl alcohol and thin films of an inorganic oxide provided directly or through an adhesive layer on both sides of the moisture absorbing resin layer (PCT/JP98/01781). However, the moistureproof film requires the use of a moisture absorbing resin, so that there is a limitation on selection of resin materials. Also, in order to reduce the amount of moisture which can permeate the moistureproof film as well as to lower its moisture permeability, the moisture absorbing resin layer must be dried to a completely dried state by high-level drying treatments including vacuum drying.

It is, therefore, an object of the present invention to provide a moistureproof multilayer film having high moistureproofness, essentially comprising a composite film including a non-moisture absorbing resin layer and vapor deposited film of an inorganic oxide or a metal formed at least one side of the non-moisture absorbing resin layer. Another object of this invention is to provide a method for producing the moistureproof multilayer film.

As a result of zealous studies to solve the problems of the prior arts, the present inventors found that a moistureproof multilayer film having high moistureproofness comparable to that of PCTFE film and moderate flexibility and softness can be obtained by a method comprising preparing a multilayer film comprising a composite film which includes a non-moisture absorbing resin film and a vapor deposited film of an inorganic oxide or a metal formed on at least one side of the non-moisture absorbing resin film and which has such a layer structure that the composite film is laminated through an adhesive layer on another non-moisture absorbing resin layer or on another composite film with the vapor deposited films thereof facing each other, in which a total number (n) of the deposited films laminated adjacent to the adhesive layer is 2 to 8, and heat-treating the multilayer film at a relatively low temperature of lower than 140° C. for at a long time.

According to the method of this invention, the heat treatment of the multilayer film does not have to be performed under tension but can be carried out by allowing it to stand in a heating furnace in a rolled-up state, for example. Thus, the method of this invention is suitable for mass-production. Also, in the method of this invention, the heat treatment can be carried out at a relatively low temperature 55° C. or higher and lower than 140° C. According to the results of experiments conducted by the present inventors, when the multilayer film is subjected to a high-temperature heat treatment, the moisture permeability thereof tends to lower. Especially, when the multilayer film is heat-treated at as high a temperature as 170° C. or higher, the moisture permeability thereof considerably lowers. Additionally, in the method of this invention, a moisture absorbing resin layer is not essential, and there is no need to dry a moisture absorbing resin layer until it is completely dried. The moistureproof multilayer film of this invention can have flexibility suitable for use as, for example, a moistureproof material for an EL element body by adjusting the total number of vapor deposited films within a moderate range. This invention has been made based on these findings.

DISCLOSURE OF THE INVENTION

According to the present invention, there is provided a moistureproof multilayer film, comprising a composite film having a non-moisture absorbing resin layer and a vapor deposited film of an inorganic oxide or a metal formed on
at least one side of the non-moisture absorbing resin layer, the multilayer film having such a layer structure where the vapor deposited film surface of the composite film is laminated through an adhesive layer on a vapor deposited film surface of another composite film or a surface of another non-moisture absorbing resin layer, in which a total number (n) of the deposited films laminated adjacent to the adhesive layer is 2 to 8, and in which a moisture permeability (W; unit: g/m².day) as measured under conditions of a temperature of 40° C. and a relative humidity of 100% satisfies the relation represented by the equation (1):

$$W \leq (1/n) \times 0.20. \tag{1}$$

According to the present invention, there is also provided a method for producing a moistureproof multilayer film comprising a composite film having a non-moisture absorbing resin film and a vapor deposited film of an inorganic oxide or a metal formed on at least one side of the non-moisture absorbing resin layer, the method comprising:

(1) preparing a multilayer film having such a layer structure where the vapor deposited film surface of the composite film is laminated through an adhesive layer on a vapor deposited film surface of another composite film or a surface of another non-moisture absorbing resin layer, wherein a total number (n) of the vapor deposited films laminated adjacent to the adhesive layer is 2 to 8, and (2) subjecting the multilayer film to a heat treatment in a hot dry atmosphere at a temperature lower than 140° C. but not lower than 55° C. for at least 10 hours.

The present invention will fully be understood, referring to the following detailed description. Further extensive applications of the invention will be apparent from the following description in details. However, it should be noted that the detailed description and specific examples are preferred embodiments of the invention, only for the purpose of the description thereof. Because it is apparent for the person ordinary skilled in the art to modify and change in variety of manners, within the scope and spirits of the invention. The applicant does not intend to dedicate any disclosed embodiments to the public, and to the extent any disclosed modifications or alternations may not literally fall within the scope of the Claims, they are considered to be part of the invention under the doctrine of the equivalents.

BEST MODE FOR CARRYING OUT THE INVENTION

Figure 1:
FIG. 1 is a schematic cross-sectional view, illustrating an example of the layer structure of a moistureproof multilayer film according to this invention.

A moistureproof multilayer film of this invention essentially comprises at least two non-moisture absorbing layers, at least two vapor deposited films and at least two adhesive layers.

1. Non-Moisture Absorbing Resin Layer

A non-moisture absorbing resin for use in this invention is a synthetic resin having a water absorption (JIS K-7209) of generally 1.0% or lower, preferably 0.8% or lower and more preferably 0.5% or lower. Specific examples of the non-moisture absorbing resin include polyolefin resins such as polyethylene, polypropylene, poly-4-methylpentene; polyester resins such as poly(ethylene terephthalate), poly (butylene terephthalate) and poly(ethylene naphthalate); chloride containing resins such as polyvinyl chloride and polyvinylidene chloride; polyvinyl aromatic resins such as polystyrene; polycarbonate, poly(phenylene sulfide), polyimide and polysulfone.

The layer of non-moisture absorbing resin may be either an unstretched film or a stretched film, and preferably a biaxially stretched film such as a biaxially stretched poly (ethylene terephthalate) film. The non-moisture absorbing resin preferably has a melting point, a Vicat softening point or a decomposition temperature which is equal to or higher than a specified heat treatment temperature so that the non-moisture absorbing resin layer can have shape retaining properties at the heat treatment temperature.

The thickness of the non-moisture absorbing resin layer is not specifically limited but generally 5–400 $\mu$m, preferably 8–200 $\mu$m and more preferably 10–100 $\mu$m. When the non-moisture absorbing resin layer is a biaxially stretched film, a thickness of 10–20 $\mu$m is generally sufficient. The non-moisture absorbing resin layer may contain additives such as an antioxidant, ultraviolet absorbent, antielectrostatic agent, colorant, antiblocking agent or slipping agent, plasticizer, and frame retardant when necessary. The non-moisture absorbing resin layer may be subjected to a surface treatment such as a corona discharge treatment, plasma treatment, ozone treatment, ultraviolet irradiation treatment, electron beam irradiation treatment or primer coating treatment in advance to improve adhesion of the vapor deposited film. Above all, a primer coating treatment is preferred. Preferably, the non-moisture absorbing resin has high transparency.

In this invention, the non-moisture absorbing resin layer is used in the form of a composite film having a vapor deposited film provided on at least one side thereof, and, when necessary, a non-moisture absorbing resin layer having no vapor deposited film may be used as a layer component of the multilayer film.

2. Vapor Deposited Film of an Inorganic Oxide or a Metal

The vapor deposited film of an inorganic oxide or a metal may be provided on one or both sides of the non-moisture absorbing resin layer but is preferably provided on only one side of the non-moisture absorbing resin layer in view of the flexibility and softness of the resulting multilayer film. Specific examples of the inorganic oxide include metal oxides such as aluminum oxide, zinc oxide, tin oxide, indium oxide, titanium oxide and mixtures thereof; and silicon oxides such as SiO, $SiO_2$, and mixtures thereof. Specific examples of the metal include aluminum, gold, silver, platinum, palladium, tin, nickel, cobalt, zinc, titanium, indium and mixtures thereof. Above all, a vapor deposited film of a silicon oxide, aluminum, or aluminum oxide is preferred, and a vapor deposited film of a silicon oxide is particularly preferred. The vapor deposited film of a silicon oxide may contain impurities such as calcium, magnesium and their oxides as long as they are in as small an amount as 10% by weight or less.

The vapor deposited film can be provided at least one side of the non-moisture absorbing resin layer (non-moisture absorbing resin film) by a vacuum vapor deposition method (physical vapor phase growth method, chemical vapor phase growth method, etc.), ion plating method, sputtering method, reaction vapor deposition method or the like. The reaction vapor deposition method is one in which vapor deposition is carried out while supplying oxygen gas using a metal or an inorganic oxide as a deposition source material. The vacuum vapor deposition method and the other methods are well known to persons having ordinary skill in the art, and the vapor deposition can be carried out in the ordinary way.

The thickness of the vapor deposited film is generally 10–500 nm, preferably 20–200 nm, more preferably 30–100 nm. When the vapor deposited film is excessively thin, the moistureproofness will be poor. When the vapor deposited film is excessively thick, the film may be curled or the vapor deposit film itself can crack or flake off easily. As the non-moisture absorbing resin film having a vapor deposited film formed thereon, a commercially available product may be used. Preferred examples of the commercially available product include Teckbarrier series, such as Teckbarrier H, Teckbarrier U, Teckbarrier T and Teckbarrier V, manufactured by Mitsubishi Chemical Kohjin PAX Corporation; and MOS series, such as MOS-TH, MOS-TB, manufactured by Oike Industrial Co., Ltd. Those are all biaxially stretched poly(ethylene terephthalate) films (biaxially stretched PET film) having a vapor deposited film of a silicon oxide formed on one side thereof. Especially, Teckbarrier series are preferred since they can considerably be improved in moistureproofness by heat treatment.

3. Adhesive Layer

In this invention, a multilayer film is manufactured having such a layer structure where the vapor deposited film surface of a composite film in which the vapor deposited film of a metal or an inorganic oxide is formed on at least one side of a non-moisture absorbing resin layer is laminated through an adhesive layer on the vapor deposited film surface of another composite film or the surface of another non-moisture absorbing resin layer. Here, "the surface of another non-moisture absorbing resin layer" may be a surface of either side of a non-moisture absorbing resin layer (film) having no vapor deposited film or a non-moisture absorbing resin layer side surface of another composite film with a vapor deposited film on one side thereof Also, "another composite film" means a composite film of the same type, namely, a composite film where the vapor deposited film of a metal or an inorganic oxide is formed on at least one side of a non-moisture absorbing resin layer Such a multilayer film is preferably prepared by laminating two or more composite films each of which includes a non-moisture absorbing resin layer and a vapor deposited film of an inorganic oxide or a metal formed on one side of the non-moisture absorbing resin layer with an adhesive. When a composite film including a non-moisture absorbing resin layer and vapor deposited films of an inorganic oxide or a metal formed on both sides of the non-moisture absorbing resin layer is used, only one composite film is sufficient. However, in view of flexibility and softness, it is preferred to use two or more composite films each of which has a vapor deposited film on one side. When necessary, a non-moisture absorbing resin layer (film) having no vapor deposited film may be used in combination with the composite films.

As the adhesive, various types of adhesives including urethane-based adhesives, acrylic-based adhesives and polyester-based adhesives can be used. Among those, a two-package (two-liquid) reactive adhesive comprising a urethane polyol component and an poly-isocyanate component is preferred. Urethane-based adhesives are divided into ones that form a polyether type polyurethane resin by reaction and ones that form a polyester type polyurethane resin by reaction, and the latter is preferred. Suitable examples of the two-package reactive adhesive include AD-502/CAT-10 and AD-578A/CAT-10 available from Toyo Morton K. K.

The thickness of the adhesive layer is generally 1–50 μm, preferably 2–10 μm and more preferably 3–5 μm. The adhesive layer is preferably formed by applying an adhesive on a vapor deposited film or on the film and drying it according to a dry laminate method. After the formation of the adhesive layer, the layers are bonded to each other by dry lamination according to an ordinary method, such as by nipping with heat rolls. Thereby, the multilayer film can be obtained.

4. Multilayer Film

Figure 2:
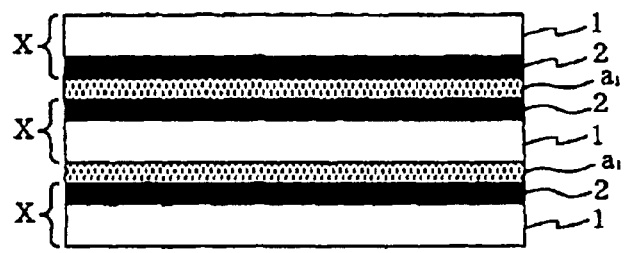
FIG. 2 is a schematic cross-sectional view, illustrating another example of the layer structure of a moistureproof multilayer film according to this invention.
Figure 3:
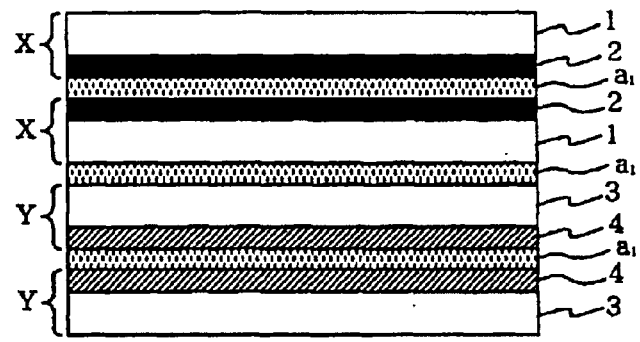
FIG. 3 is a schematic cross-sectional view, illustrating another example of the layer structure of a moistureproof multilayer film according to this invention.

Description will be made of the basic layer structure of the multilayer film used in this invention with reference to FIG. 1 to FIG. 5. FIG. 1 illustrates a multilayer film prepared by laminating two composite films X, each of which includes a non-moisture absorbing resin layer 1 and a vapor deposited film 2 formed on one side of the non-moisture absorbing resin layer 1, with the vapor deposited film surfaces thereof facing each other through an adhesive layer $a_1$ and having a layer structure of "non-moisture absorbing resin layer/vapor deposited film/adhesive layer/vapor deposited film/non-moisture absorbing resin layer". FIG. 2 illustrates a multilayer film prepared by using three composite films X, each of which includes a non-moisture absorbing resin layer 1 and a vapor deposited film 2 formed on one side of the non-moisture absorbing resin layer 1, and having a layer structure of "non-moisture absorbing resin layer/vapor deposited film/adhesive layer/vapor deposited film/non-moisture absorbing resin layer/adhesive layer/vapor deposited film/non-moisture absorbing resin layer". FIG. 3 illustrates a multilayer film prepared by using two composite films X, each of which includes a non-moisture absorbing resin layer 1 and a vapor deposited film 2 formed on one side of the non-moisture absorbing resin layer 1, and two composite films Y, each of which includes a non-moisture absorbing resin layer 3 and a vapor deposited film 4 formed on one side of the non-moisture absorbing resin layer 3, and having a layer structure of "non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer".

Figure 4:
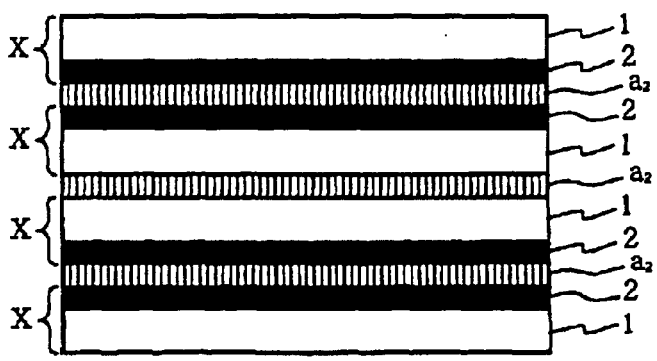
FIG. 4 is a schematic cross-sectional view illustrating another example of the layer structure of a moistureproof multilayer film according to this invention.
Figure 5:
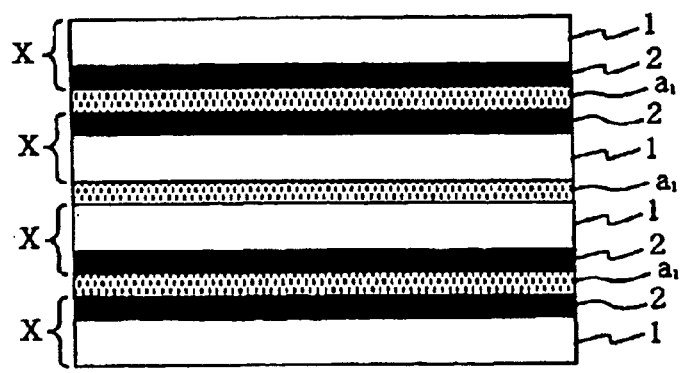
FIG. 5 is a schematic cross-sectional view, illustrating another example of the layer structure of a moistureproof multilayer film according to this invention.

FIG. 4 illustrates a multilayer film prepared by laminating, through adhesive layers $a_2$, four composite films X, each of which includes a non-moisture absorbing resin layer 1 and a vapor deposited film 2 formed on one side of the non-moisture absorbing resin layer 1 and having a layer structure of "non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer". FIG. 5 illustrates a multilayer film having the same layer structure as that of the multilayer film shown in FIG. 4 except that adhesive layers $a_1$ are used in place of the adhesive layers $a_2$. Specific examples of the layer structure of the multilayer films shown in FIG. 1 to FIG. 5 will be shown in Embodiments 1 to 5.

Preferred examples of the layer structure, including the above Embodiments, are as follows:

(1) Non-moisture absorbing resin layer/vapor deposited film/adhesive layer/vapor deposited film/non-moisture absorbing resin layer (2) Non-moisture absorbing resin layer/vapor deposited film/adhesive layer/vapor deposited film/non-moisture absorbing resin layer/adhesive layer/vapor deposited film/non-moisture absorbing resin layer (3) Non-moisture absorbing resin layer/vapor deposited film/adhesive layer/vapor deposited film/non-moisture absorbing resin layer/adhesive layer/vapor deposited film/non-moisture absorbing resin layer/adhesive layer/vapor deposited film/non-moisture absorbing resin layer (4) Non-moisture absorbing resin layer/vapor deposited film/adhesive layer/non-moisture absorbing resin layer/vapor deposited film/adhesive layer/vapor deposited film/non-moisture absorbing resin layer/adhesive layer/vapor deposited film/non-moisture absorbing resin layer (5) Non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer (6) Non-moisture absorbing resin layer/vapor deposited film/adhesive layer/non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer (7) Non-moisture absorbing resin layer/vapor deposited film/adhesive layer/non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer/adhesive layer/vapor deposited film/non-moisture absorbing resin layer (8) Non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer/adhesive layer/vapor deposited film/non-moisture absorbing resin layer/adhesive layer/vapor deposited film/non-moisture absorbing resin layer (9) Non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer

(10) Non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer/adhesive layer/non-moisture absorbing resin layer/vapor deposited film/adhesive layer/vapor deposited film/non-moisture absorbing resin layer/adhesive layer/vapor deposited film/non-moisture absorbing resin layer The layer structure of the multilayer film is not limited to the above examples. In the multilayer films, the number of the vapor deposited films provided adjacent to (in contact with) an adhesive layer is 2 to 8 in total, preferably 2 to 6 in total. When the total number of the vapor deposited films provided adjacent to an adhesive layer is 3 or greater, a multilayer film having low moisture permeability can stably be obtained. As the total number of the vapor deposited films increases, the moistureproofness of the multilayer film is enhanced but its flexibility and softness decrease. This makes the multilayer film difficult to fold. Also, it is not economical to provide a large number of vapor deposited films. When the multilayer film has only one vapor deposited film, it is difficult to attain sufficiently low moisture permeability even by a heat treatment. According to the method of this invention, when the total number of the vapor deposited films is on the order of 2 to 6, a multilayer film having high moistureproofness (low moisture permeability) comparable to that of PCTFE film can be obtained. The total number of the vapor deposited films is generally controlled by the number of non-moisture absorbing resin films having a vapor deposited film formed on one side thereof. The multilayer film may additionally include a vapor deposited film which is not adjacent to an adhesive layer.

Preferably, the multilayer film for use in this invention includes at least two composite films (X), each of which includes a non-moisture absorbing resin layer and a vapor deposited film of an inorganic oxide or a metal formed on one side or both sides (preferably one side) of the non-moisture absorbing resin layer, and has such a layer structure that at least two of the composite films are laminated through an adhesive layer with the vapor deposited film surfaces thereof facing each other, as shown in FIG. 1. In the multilayer film, the number of the layer structures each of which includes vapor deposited film surfaces facing each other through an adhesive layer is generally 1 to 4, preferably 1 to 3, more preferably 1 to 2. When the multilayer film includes a layer structure including vapor deposited film surfaces facing each other through an adhesive layer, the multilayer film can obtain high moistureproofness by a heat treatment. Also, when two or more composite films having a vapor deposited film on one side are laminated through an adhesive layer with the vapor deposited film surfaces thereof facing each other, the moistureproofness of the multilayer film can be improved without losing the flexibility and softness. Additionally, such a layer structure enables the total number of vapor deposited films necessary to improve the moistureproofness of the multilayer film to be secured while reducing the number of the layers used in the basic layer structure thereof.

The multilayer film for use in this invention, which has a basic layer structure as mentioned above, may have one or more resin layers having no vapor deposited film as the innermost layer, the outermost layer, or a middle layer for the purpose of improving strength or heat resistance or imparting heat sealability when desired. Such additional resin layers are preferably composed of synthetic resins having transparency. The additional resin layers may be composed of the same resin as that for the aforementioned non-moisture absorbing resin layer. Specific examples of the additional resin layers include a heat-treated film formed from a mixture of polyvinyl alcohol (PVA) with a poly(meth)acrylic acid or a partially neutralized poly(meth)acrylic acid (JP-A-H06-220221); gas-barrier films such as one formed from a mixture of sugar with poly(meth)acrylic acid or a partially neutralized poly(meth)acrylic acid (JP-A-H07-165942); and a composite film including a thermoplastic resin layer and such a gas-barrier film formed on at least one side of the thermoplastic resin layer can be used. In addition, a layer of a moisture absorbing resin such as PVA, a sanctified ethylene-vinyl acetate copolymer (EVOH) or polyamide can also be used. When desired, the additional resin layers may contain additives such as ultraviolet absorber and a pigment for changing the color of the EL element.

To impart heat sealability to the moistureproof multilayer film of this invention, a heat sealable resin layer may be provided as the innermost layer (a layer by which heat-sealing is made). Preferred examples of the heat sealable resin layer include a polyolefin type hot-melt sealant layer and an epoxy type hot-melt sealant layer. The thickness of the sealant layer is generally on the order of 10–300 $\mu$m. When an EL element body is sealed with the moistureproof multilayer film of this invention, the heat sealable resin layer may be provided only at a portion which is to surround the EL element body.

The additional resin layers can be used alone or in combination with other resin layers. Each of the additional resin layers can be placed in position in the multilayer film through an adhesive layer and, when necessary, may be melt-bonded without using an adhesive layer. Additionally, the additional resin layers may be laminated on one or both sides of the multilayer film after the heat treatment. A hot-melt sealant layer is preferably laminated on the multilayer film after the heat treatment.

Preferably, both of the multilayer film having the basic layer structure and the multilayer film including additional resin layers have transparency. The degree of the transparency is dependent on the usage. When the moistureproof multilayer film is used as a moistureproof material for an EL element, it must be transparent to such an extent that light from the luminescent layer can pass through it.

5. Heat Treatment

In the method of this invention, the multilayer film (including a film having additional resin layers) is subjected to a heat treatment under specific conditions to improve the moistureproofness considerably. When a reactive adhesive such as a two-package reactive urethane-based adhesive is used as the adhesive, an aging treatment is performed to induce a reaction in the adhesive prior to the heat treatment. A urethane-based adhesive is used for the adhesive layers in the process of fabrication of the multilayer film, the multilayer film is preferably subjected to an aging treatment for the adhesive at 30–50° C. for at least 24 hours prior to the heat treatment. When the aging treatment temperature is excessively low, the curing reaction takes a long time. Too high an aging treatment temperature may cause formation of gas bubbles which adversely affect the moisture permeability of the multilayer film. More preferably, the aging treatment temperature is around 40° C. The aging treatment time is preferably 24 hours (one day) to 168 hours (seven days), more preferably 48 hours (two days) to 96 hours (four days).

In the heat treatment process of the multilayer film, the multilayer film is heat-treated in a hot dry atmosphere having a temperature of at least 55° C. and lower than 140° C. for at least 10 hours. The heat treatment temperature is preferably 60–130° C. more preferably 70–120° C. When the heat treatment temperature is excessively low, it takes a long time to sufficiently lower the moisture permeability of the multilayer film, resulting in low productivity. Too high a heat treatment temperature is less effective in lowering the moisture permeability or rather increases it. The heat treatment time is preferably at least 30 hours, more preferably at least 100 hours. In view of productivity and in order to stably attain a low moisture permeability value, it is preferred that the heat treatment time is decreased when the heat treatment temperature is high, and increased when the heat treatment temperature is low. Although there is no specific upper limit on the heat treatment time, it is about 1200 hours when the heat treatment temperature is low.

In the heat treatment, there is no need to apply tension to the multilayer film. The prior art (JP-A-H08-300549) teaches a high-temperature, short-time heat treatment under tension. In this invention, however, surprisingly, a multilayer film having moisture permeability comparable to that of PCTFE film can be obtained by a heat treatment at a relatively low temperature for a long time under no tension. When the heat treatment is carried out on an industrial scale, a method is preferred in which the multilayer film wound in a roll is allowed to stand in a heating furnace adjusted to a desired temperature for a predetermined period of time. When such a heat treatment method is employed, since there is no need to heat the multilayer film under tension, a large amount of multilayer film can be treated at a time even if the heat treatment time is long. Thus, productivity is not lowered.

In this invention, a moistureproof multilayer film having high moistureproofness, namely having a moisture permeability as measured under conditions of a temperature of 40° C. and a relative humidity of 100% of 0.10 g/m².day or lower, preferably 0.08 g/m2.day or lower and more preferably 0.06 g/m².day or lower can be obtained by the heat treatment. In many cases, it is possible to obtain a moistureproof multilayer film having a moisture permeability of 0.05 g/m².day or lower, most preferably 0.02–0.04 g/m².day. The moisture permeability of PCTFE film as measured under the same conditions is about 0.03 g/m².day. Therefore, according to this invention, a moistureproof multilayer film having moistureproofness comparable to that of PCTFE film can be obtained.

As the number of composite films in the multilayer film increases, the moisture permeability of the multilayer film decreases. According to this invention, a moistureproof multilayer film having a moisture permeability which satisfies the relation represented by the equation (1) can be obtained:

$$W \leq (1/n) \times 0.20 \tag{1}$$

wherein n is the total number of vapor deposited films laminated adjacent to an adhesive layer, and W is a moisture permeability (unit: g/m².day). More specifically, in the case of a multilayer film in which the total number of the vapor deposited films laminated adjacent to an adhesive layer as shown in FIG. 1 is 2 (n=2), a moisture permeability of 0.10 g/m².day or lower can be attained by the heat treatment.

Analysis of experimental data has proved that there are the following relations expressed by the following equations among the heat treatment temperature, the heat treatment time and the moisture permeability of a multilayer film. To provide a multilayer film with a moisture permeability (W) of (1/n)×0.20 g/m².day or lower, the heat treatment is preferably performed under conditions which satisfy the equation (I):

$$T \geq 3 \times 10^{10} \times t^{-4.5184}. \tag{I}$$

wherein T is the heat treatment time (Hr) and t is the heat treatment temperature (K).

Namely, when the heat treatment temperature t (K) is set to a temperature between 55° C. (328K) and lower than 140° C. (413K), the multilayer film is heat-treated for at least time duration of T (Hr) at that heat treatment temperature to attain a moisture permeability of (1/n)×0.20 g/m².day or lower.

To attain a moisture permeability of (1/n)×0.16 g/m².day or lower, the multilayer film is preferably heat-treated under conditions which satisfy the equation (II):

$$T \geq 2 \times 10^{11} \times t^{-4.6651}. \tag{II}$$

wherein T is the heat treatment time (Hr) and t is the heat treatment temperature (K).

To attain a moisture permeability of (1/n)×0.12 g/m².day or lower, the multilayer film is preferably heat-treated under conditions which satisfy the equation (III):

$$T \geq 3 \times 10^{10} \times t^{-4.1345}. \tag{III}$$

wherein T is the heat treatment time (Hr) and t is the heat treatment temperature (K).

The power numbers in the equations (I), (II) and (III) are −4.5184, −4.6651 and −4.1345, respectively.

6. Application

The moistureproof multilayer film of this invention can be used as a packaging material and a sealing material for food, medicine, electronic components and so on due to its high moistureproofness. The moistureproof multilayer film of this invention exhibits moistureproofness comparable to that of PCTFE film and thus is particularly suitable for use as a packaging film for sealing electronic components such as an electroluminescence element body.

Figure 6:
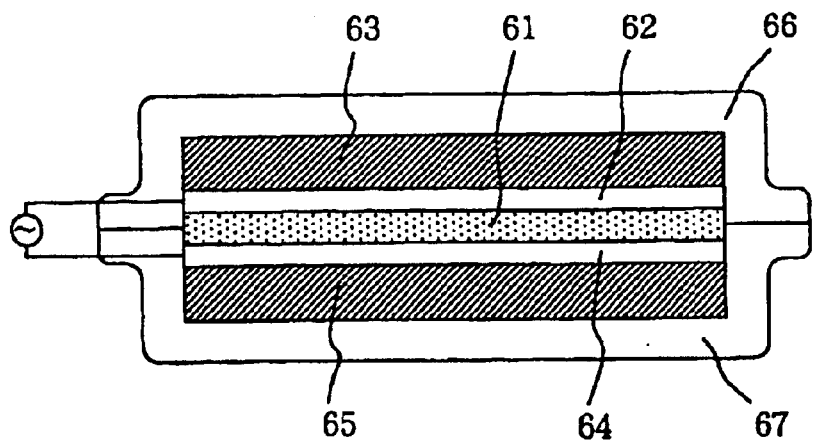
FIG. 6 is a schematic cross-sectional view, illustrating an example of the layer structure of an electroluminescence (EL) element.

Description will be made of a case where the moistureproof multilayer film of this invention is applied to a moistureproof material for an EL element body with reference to a specific example. FIG. 6 is a schematic cross-sectional view, illustrating an example of an EL element. The EL element shown in FIG. 6 has such a structure that an EL element body comprising substrates 63 and 65 provided with electrodes 62 and 64, respectively, and a luminescent layer 61 interposed between the substrates 63 and 65 is sealed with a pair of moisture proofing members 66 and 67. Lead lines are respectively connected to the paired electrodes 62 and 64 to apply an electric field to the luminescent layer 61 by electric power supplied from an external power source. At least one of the substrates 63 and 65 is composed of a transparent material such as a plastic film or a glass plate so that light from the luminescent layer can transmit therethrough to the outside. At least one of the electrodes 62 and 64 is made of a metal or a metal oxide such as ITO (indium-tin double oxide), and at least one of them is made transparent so that light from the luminescent layer can transmit therethrough to the outside. Thus, when the substrate 63 and the electrode 62 are transparent, the other substrate 65 and the electrode 64 may be opaque, or an aluminum foil and the like may be used to be a combined substrate and electrode. A plurality of EL element bodies may be arranged in a plane or laminated. In this case, the plurality of EL bodies can be sealed together with the moistureproof materials.

At least one of the paired moistureproof materials 66 and 67 is composed of the moistureproof multilayer film of this invention, and the other may be a glass substrate or a metal plate. When the moistureproof material 67 is, for example, a glass substrate, the substrate 65 thereon may be omitted to provide the electrode 64 directly on the glass substrate. When the paired moistureproof materials 66 and 67 are both moistureproof multilayer films of this invention, they may be composed of two moistureproof multilayer films but one moistureproof multilayer film may be folded back.

Figure 7:
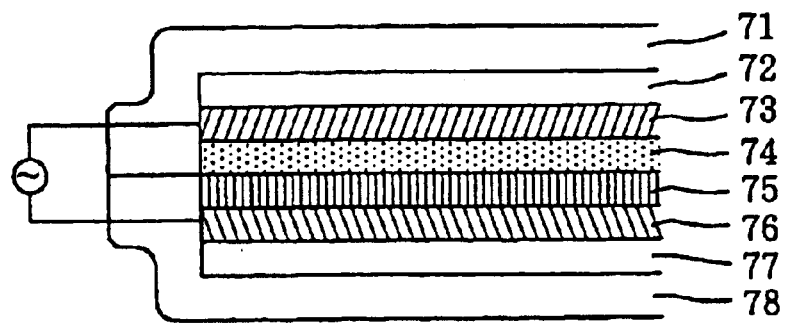
FIG. 7 is a schematic cross-sectional view, illustrating another example of the layer structure of an EL element.

FIG. 7 is a schematic cross-sectional view, illustrating another EL element intended by this invention. The EL element shown in FIG. 7 has such a structure that a luminescent layer 74 composed of a powdery phosphor bound with an organic binder and a dielectric layer 75 at one side thereof for preventing dielectric breakdown are sandwiched between a transparent conductive film (ITO) 73 and a back electrode (aluminum foil) 76. In the EL element shown in FIG. 7, moisture-absorbing films 72 and 77 are inserted for dehumidification and it is sealed with moistureproof materials 71 and 78. When the moistureproof multilayer films of this invention are used as the moistureproof materials 71 and 78, an EL element having flexibility can be obtained.

EMBODIMENTS

The following Embodiments and Comparative Examples will further illustrate this invention. The physical properties in the Embodiments and examples were determined according to the following methods:

(1) Moisture Permeability

Moisture permeability is measured by means of a water vapor transmission tester, PERMATRAN-W3/31SW manufactured by Modern Control Co. according to ASTM F-1249 (JIS K 7129 Method B). The specific procedure is as follows. A flat multilayer film (sample) for measurement is fixed in a diffuser cell to partition the diffuser cell into a dried chamber and a humidity-controlled chamber by the sample. The whole diffuser cell is allowed to stand in an atmosphere of 40° C. until the temperature of the sample becomes 40° C. The dried chamber has been exposed to a dry nitrogen stream, while the humidity-controlled chamber has been exposed to 100% RH brought about by a sponge soaked with distilled water under a nitrogen stream since before the chambers are partitioned by the sample. When about 1 hour has elapsed after partitioning the diffuser cell with the sample, the relative humidities in the dried chamber and the humidity-controlled chamber reach 0% and 100%, respectively. It is the time to start the measurement. Water vapor which permeates from the humidity-controlled chamber into the dried chamber through the sample is mixed into the dried nitrogen stream and transported to an infrared sensor. The infrared sensor measures the proportion of infrared energy absorbed in the water vapor, converts it into an electric signal, and calculates the moisture permeability of the sample based thereon. By the above method, the moisture permeability of the multilayer film under conditions of 40° C. and 100% RH (unit: g/m$^2$.day) is obtained.

(2) Luminance brightness Retention Rate of EL element

An EL element sample is allowed to stand for 500 hours under conditions of a temperature of 60° C. and a relative humidity of 90% and then connected to a power source with an operating voltage of 100 V and an operating frequency of 400 Hz to measure its initial luminance brightness $L_0$ at room temperature. The EL element sample is then allowed to stand for 750 hours at room temperature with the voltage applied thereto and then measured for the luminance brightness $L_1$. Then, the luminance brightness retention rate is calculated by the following equation:

Luminance brightness retention rate=$(L_1 L_0) \times 100$ (%).

Embodiment 1

A moistureproof multilayer film having a layer structure shown in FIG. 1 was prepared. The multilayer film has the following layers from outside to inside:

(1) A biaxially stretched poly(ethylene terephthalate) film having a vapor deposited film of a silicon oxide thereon ["Teckbarrier H" made by Mitsubishi Chemical Kohjin PAX Corporation, thickness: 12 μm] (the vapor deposited film is on the inside surface).

(2) A urethane-based adhesive layer ["AD-502/CAT-10" made by Toyo Morton K.K, thickness: 3.5 μm]

(3) A biaxially stretched poly(ethylene terephthalate) film having a vapor deposited film of a silicon oxide thereon ["Teckbarrier H" made by Mitsubishi Chemical Kohjin PAX Corporation, thickness: 12 μm] (the vapor deposited film is on the outside surface).

Each layer was laminated through the urethane-based adhesive layer by a dry laminate method, thereby obtaining a transparent multilayer film. The multilayer film was wound into a roll and subjected to an aging treatment at 40° C. for 72 hours. The multilayer film, still in the rolled-up state, was then subjected to a heat treatment for 140 hours in a heating furnace adjusted to 120° C. The results are summarized in Table 1.

Comparative Example 1

A multilayer film was prepared in the same manner as in Embodiment 1 except that the heat treatment was not performed after the aging treatment. The results are summarized in Table 1.

Embodiment 2

A moistureproof multilayer film having a layer structure shown in FIG. 2 was prepared. The multilayer film has the following layers from outside to inside:

(1) A biaxially stretched poly(ethylene terephthalate) film having a vapor deposited film of a silicon oxide thereon ["Teckbarrier H" made by Mitsubishi Chemical Kohjin PAX Corporation, thickness: 12 μm] (the vapor deposited film is on the inside surface).

(2) A urethane-based adhesive layer ["AD-502/CAT-10" made by Toyo Morton K.K., thickness: 3.5 μm]

(3) A biaxially stretched poly(ethylene terephthalate) film having a vapor deposited film of a silicon oxide thereon ["Teckbarrier H" made by Mitsubishi Chemical Kohjin PAX Corporation, thickness: 12 μm] (the vapor deposited film is on the outside surface).

(4) A urethane-based adhesive layer ["AD-502/CAT-10" made by Toyo Morton K.K., thickness: 3.5 μm]

(5) A biaxially stretched poly(ethylene terephthalate) film having a vapor deposited film of a silicon oxide thereon ["Teckbarrier H" made by Mitsubishi Chemical Kohjin PAX Corporation, thickness: 12 μm] (the vapor deposited film is on the outside surface).

Each layer was laminated through the urethane-based adhesive layer by a dry laminate method, thereby obtaining a transparent multilayer film. The multilayer film was wound into a roll and subjected to an aging treatment at 40° C. for 72 hours. The multilayer film, still in the rolled-up state, was then subjected to a heat treatment for 250 hours in a heating furnace adjusted to 100° C. The results are summarized in Table 1.

Comparative Example 2

A moistureproof multilayer film was prepared in the same manner as in Embodiment 2 except that the heat treatment was not performed after the aging treatment. The results are summarized in Table 1.

Embodiment 3

A multilayer film having a layer structure shown in FIG. 3 was prepared. The multilayer film has the following layers from outside to inside:

(1) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the inside surface).

(2) A urethane-based adhesive layer ["AD-502/CAT-10" made by Toyo Morton K.K., thickness: 3.5 $\mu$m]

(3) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the outside surface).

(4) A urethane-based adhesive layer ["AD-502/CAT-10" made by Toyo Morton K.K., thickness: 3.5 $\mu$m]

(5) A biaxially stretched poly(ethylene terephthalate) film having a vapor deposited film of a silicon oxide thereon ["MOS-TH" made by Oike Industrial Co., Ltd, thickness: 12 $\mu$m] (the vapor deposited film is on the inside surface).

(6) A urethane-based adhesive layer ["AD-502/CAT-10" made by Toyo Morton K.K., thickness: 3.5 $\mu$m]

(7) A biaxially stretched poly(ethylene terephthalate) film having a vapor deposited film of a silicon oxide thereon ["MOS-TH" made by Oike Industrial Co., Ltd, thickness: 12 $\mu$m] (the vapor deposited film is on the outside surface).

Each layer was laminated through the urethane-based adhesive layer by a dry laminate method, thereby obtaining a transparent multilayer film. The multilayer film was wound into a roll and subjected to an aging treatment at 40° C. for 72 hours. The multilayer film, still in the rolled-up state, was then subjected to a heat treatment for 200 hours in a heating furnace adjusted to 110° C. The results are summarized in Table 1.

Comparative Example 3

A multilayer film was prepared in the same manner as in Embodiment 3 except that the heat treatment was not performed after the aging treatment. The results are summarized in Table 1.

Embodiment 4

A moistureproof multilayer film having a layer structure shown in FIG. 4 was prepared. The multilayer film has the following layers from outside to inside:

(1) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the inside surface).

(2) A urethane-based adhesive layer ["AD-578A/CAT-10" made by Toyo Morton K.K., thickness: 3.5 $\mu$m]

(3) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the outside surface).

(4) A urethane-based adhesive layer ["AD-578A/CAT-10" made by Toyo Morton K.K., thickness: 3.5 $\mu$m]

(5) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the inside surface).

(6) A urethane-based adhesive layer ["AD-578A/CAT-10" made by Toyo Morton K.K., thickness: 3.5 $\mu$m]

(7) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the outside surface).

Each layer was laminated through the urethane-based adhesive layer by a dry laminate method, thereby obtaining a transparent multilayer film. The multilayer film was wound into a roll and subjected to an aging treatment at 40° C. for 72 hours. The multilayer film, still in the rolled-up state, was then subjected to a heat treatment for 800 hours in a heating furnace adjusted to 70° C. The results are summarized in Table 1.

Comparative Example 4

A multilayer film was prepared in the same manner as in Embodiment 4 except that the heat treatment was not performed after the aging treatment. The results are summarized in Table 1.

Embodiment 5

A moistureproof multilayer film having a layer structure shown in FIG. 5 was prepared. The multilayer film has the following layers from outside to inside:

(1) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the inside surface).

(2) A urethane-based adhesive layer ["AD-502/CAT-10" made by Toyo Morton K.K., thickness: 3.5 $\mu$m]

(3) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the outside surface).

(4) A urethane-based adhesive layer ["AD-502/CAT-10" made by Toyo Morton K.K., thickness: 3.5 $\mu$m]

(5) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the inside surface).

(6) A urethane-based adhesive layer ["AD-502/CAT-10" made by Toyo Morton K.K., thickness: 3.5 $\mu$m]

(7) A biaxially stretched poly(ethylene terephthalate) film having a vapor deposited film of a silicon oxide thereon ["Teckbarrier H" made by Mitsubishi Chemical Kohjin PAX Corporation, thickness: 12 $\mu$m] (the vapor deposited film is on the outside surface).

Each layer was laminated through the urethane-based adhesive layer by a dry laminate method, thereby obtaining a transparent multilayer film. The multilayer film was wound into a roll and subjected to an aging treatment at 40° C. for 72 hours. The multilayer film, still in the rolled-up state, was then subjected to a heat treatment for 400 hours in a heating furnace adjusted to 85° C . The results are summarized in Table 1.

Comparative Example 5

A multilayer film was prepared in the same manner as in Embodiment 5 except that the heat treatment was not performed after the aging treatment. The results are summarized in Table 1.

Comparative Example 6

The moisture permeability of a poly(chlorotrifluoroethylene) film [PCTFE film "NITOFLONE NO. 4820" made by NITTO DENKO CORPORATION, thickness: 200 μm] was measured. The results are shown in Table 1.

high moistureproofness (low moisture permeability) even if the time and/or temperature of the heat treatment are varied. On the contrary, when the heat treatment temperature is increased to 150° C. (Comparative examples 7 to 11), the moisture permeability cannot be sufficiently lowered and varies depending upon the heat treatment time. When the heat treatment temperature is increased to 170° C. (Comparative examples 12 to 16), the moisture permeability rather increases and varies largely depending upon the heat treatment time.

TABLE 1

| | | Vapor deposited film | | Aging treatment | | Heat treatment | | Moisture permeability |
|---|---|---|---|---|---|---|---|---|
| | Layer structure | Thickness (μm) | (Number of layers) | Temperature (° C.) | Time (Hr) | Temperature (° C.) | Time (Hr) | 40° C. · 100% RH (g/m² · day) |
| Embodiment 1 | FIG. 1 | 28 | 2 | 40 | 72 | 120 | 140 | 0.04 |
| Embodiment 2 | FIG. 2 | 44 | 3 | 40 | 72 | 100 | 250 | 0.03 |
| Embodiment 3 | FIG. 3 | 59 | 4 | 40 | 72 | 110 | 200 | 0.04 |
| Embodiment 4 | FIG. 4 | 59 | 4 | 40 | 72 | 70 | 800 | 0.03 |
| Embodiment 5 | FIG. 5 | 59 | 4 | 40 | 72 | 85 | 400 | 0.03 |
| Comp. Ex. 1 | FIG. 1 | 28 | 2 | 40 | 72 | — | — | 0.24 |
| Comp. Ex. 2 | FIG. 2 | 44 | 3 | 40 | 72 | — | — | 0.18 |
| Comp. Ex. 3 | FIG. 3 | 59 | 4 | 40 | 72 | — | — | 0.15 |
| Comp. Ex. 4 | FIG. 4 | 59 | 4 | 40 | 72 | — | — | 0.14 |
| Comp. Ex. 5 | FIG. 5 | 59 | 4 | 40 | 72 | — | — | 0.13 |
| Comp. Ex. 6 | PCTFE | 200 | — | — | — | — | — | 0.03 |

As is clear from the results summarized in Table 1, the moistureproof multilayer films of the embodiments according to this invention can attain a moisture permeability of 0.03–0.04 g/m².day (40° C., 100% RH). This means that the moistureproof multilayer films of this invention have moistureproofness comparable to that of PCTFE film.

Embodiments 6 to 8 and Comparative Examples 7 to 16

A multilayer film is prepared in the same manner as in Embodiment 1 except that the heat treatment was performed under the conditions shown in Table 2 after the aging treatment. The results are summarized in Table 2.

Embodiment 9
(Preparation of Moistureproof Multilayer Film)

A biaxially stretched poly(ethylene terephthalate) film (thickness: 16 μm) and a polyolefin type hot-melt sealant layer (thickness: 50 m; "Hirodine 7589" made by Hirodine Kogyo Co., Ltd.) were dry-laminated at 65° C. through urethane-based adhesive layers ["AD-502/CAT-10" made by Toyo Morton K.K., thickness: 3.5 μm] on the inside surface of the multilayer film obtained in Embodiment 5 (after heat treatment), thereby obtaining a moistureproof multilayer film having a sealant layer as the innermost layer.
(Preparation of EL Element Body)

Cyanoethyl polyvinyl alcohol barium titanate powder and N,N'-dimethylformamide were uniformly mixed to prepare

TABLE 2

| | | Vapor deposited film | | Aging treatment | | Heat treatment | | Moisture permeability |
|---|---|---|---|---|---|---|---|---|
| | Layer structure | Thickness (μm) | (Number of layers) | Temperature (° C.) | Time (Hr) | Temperature (° C.) | Time (Hr) | 40° C. · 100% RH (g/m² · day) |
| Embodiment 6 | FIG. 1 | 28 | 2 | 40 | 72 | 85 | 260 | 0.04 |
| Embodiment 7 | FIG. 1 | 28 | 2 | 40 | 72 | 85 | 470 | 0.04 |
| Embodiment 8 | FIG. 1 | 28 | 2 | 40 | 72 | 100 | 410 | 0.04 |
| Comp. Ex. 7 | FIG. 1 | 28 | 2 | 40 | 72 | 150 | 0.2 | 0.28 |
| Comp. Ex. 8 | FIG. 1 | 28 | 2 | 40 | 72 | 150 | 1.5 | 0.17 |
| Comp. Ex. 9 | FIG. 1 | 28 | 2 | 40 | 72 | 150 | 6 | 0.27 |
| Comp. Ex. 10 | FIG. 1 | 28 | 2 | 40 | 72 | 150 | 45 | 0.29 |
| Comp. Ex. 11 | FIG. 1 | 28 | 2 | 40 | 72 | 150 | 100 | 0.60 |
| Comp. Ex. 12 | FIG. 1 | 28 | 2 | 40 | 72 | 170 | 0.2 | 0.20 |
| Comp. Ex. 13 | FIG. 1 | 28 | 2 | 40 | 72 | 170 | 0.6 | 0.72 |
| Comp. Ex. 14 | FIG. 1 | 28 | 2 | 40 | 72 | 170 | 6 | 0.52 |
| Comp. Ex. 15 | FIG. 1 | 28 | 2 | 40 | 72 | 170 | 21 | 0.63 |
| Comp. Ex. 16 | FIG. 1 | 28 | 2 | 40 | 72 | 170 | 45 | 0.54 |

The results summarized in Table 2 indicate that the moistureproof multilayer films of the embodiments according to this invention (Embodiments 6 to 8) can stably attain an insulating paste. A powdery phosphor obtained by adding Cu as an activator to cyanoethyl polyvinyl alcohol and ZnS, and N,N'-dimethylformamide were uniformly mixed to prepare a paste for luminescent layer. The insulating paste was applied on a back plate electrode of an aluminum foil (thickness: 70 μm) by screen printing to form an insulating layer (thickness: 30 μm), and the paste for luminescent layer was applied on the insulating layer by screen printing to form a luminescent layer (thickness: 40 μm).

A transparent conductive film (thickness: 75 μm) comprising a poly(ethylene terephthalate) film and a transparent vapor deposited film of ITO (indium-tin double oxide) formed on the poly(ethylene terephthalate) film was heat and pressure-bonded on the aforementioned luminescent layer with a roller laminator. Electrode lead wires were connected to the back plate electrode and the ITO layer of the transparent conductive film. Both sides of the thus fabricated EL element were coated with moisture-absorbing films of nylon (thickness: 75 μm) through an adhesive layer (ethylene-vinyl acetate copolymer, thickness: 30 μm), thereby obtaining an EL element body.

(Fabrication of EL Element)

Two moistureproof multilayer films prepared as described before were placed with the polyolefin type hot-melt sealant layer thereof facing each other, and the EL element body fabricated as above was interposed therebetween. The films were heat and pressure-bonded at 140° C. to seal the peripheries thereof, thereby obtaining an EL element of electrolytic luminescence type with a FL element body sealed with moistureproof multilayer film. The EL element has a luminance brightness retention rate of 75%.

The reference numerals used in the description are as follows:

1: biaxially stretched PET film,
2: vapor deposited film of a silicon oxide,
3: biaxially stretched PET film,
4: vapor deposited film of a silicon oxide,
a1: urethane-based adhesive layer,
a2: urethane-based adhesive layer,
X: vapor deposited film,
Y: vapor deposited film,
61: luminescent layer,
62: electrode,
63: substrate,
64: electrode,
65: substrate,
66: moistureproof material,
67: moistureproof material,
71: moistureproof material,
72: moisture absorbing film,
73: transparent conductive film,
74: luminescent layer,
76: dielectric layer,
76: back plate electrode,
77: moisture absorbing film, and
78: moistureproof material.

Industrial Applicability

According to this invention, there is provided a moistureproof multilayer film which comprises a multilayer film including a non-moisture absorbing resin layer and a vapor deposited film of an inorganic oxide or a metal formed on the non-moisture absorbing resin layer and which exhibits high moistureproofness, and a method for producing the moistureproof multilayer film. The moistureproof multilayer film of this invention is suitable for use as a packaging material and a sealing material for food, medicine, electronic components and so on. The moistureproof multilayer film of this invention can have moistureproofness comparable to poly(chlorotrifluoroethylene) film and thus particularly suitable for use as a packaging film for sealing electronic components such as an electroluminescence element.

What is claimed is:

1. A moistureproof multilayer film, comprising a composite film having a non-moisture absorbing resin layer and a vapor deposited film of an inorganic oxide or a metal formed on at least one side of the non-moisture absorbing resin layer, the multilayer film having such a layer structure where the vapor deposited film surface of the composite film is laminated through an adhesive layer on a vapor deposited film surface of another composite film or a surface of another non-moisture absorbing resin layer, wherein a total number (n) of the deposited films laminated adjacent to the adhesive layer is 2 to 8, and wherein a moisture permeability (W; unit: g/m².day) as measured under conditions of a temperature of 40° C. and a relative humidity of 100% satisfies a relation represented by equation (1).

$$W \leq (1/n) \times 0.20. \qquad (1)$$

2. The moistureproof multilayer film as recited in claim 1, comprising a plurality of the composite films.

3. The moistureproof multilayer film as recited in claim 2, wherein at least two of the composite films are laminated through an adhesive layer with the vapor deposited films thereof facing each other.

4. A method for producing a moistureproof multilayer film including a composite film having a non-moisture absorbing resin film and a vapor deposited film of an inorganic oxide or a metal formed on at least one side of the non-moisture absorbing resin film, the method comprising:

(1) preparing a multilayer film having such a layer structure where the vapor deposited film surface of the composite film is laminated through an adhesive layer on a vapor deposited film surface of another composite film or a surface of another non-moisture absorbing resin layer, wherein a total number (n) of the vapor deposited films laminated adjacent to the adhesive layer is 2 to 8, and (2) subjecting the multilayer film to a heat treatment in a hot dry atmosphere at a temperature lower than 140° C. but not lower than 55° C. for at least 10 hours.

5. The method for producing a moistureproof multilayer film as recited in claim 4, wherein, in step (2), the heat treatment is performed to obtain a moistureproof multilayer film having a moisture permeability (W; unit: g/m².day) as measured under conditions of a temperature of 40° C. and a relative humidity of 100%, the moisture permeability satisfying a relation represented by equation (1):

$$W: \leq (1/n) \times 0.20. \qquad (1)$$

6. The method for producing a moistureproof multilayer film as recited in claim 5, wherein, in step (1), the multilayer film including a plurality of the composite films is prepared.

7. The method for producing a moistureproof multilayer film as recited in claim 5, wherein, in step (2), the multilayer film is subjected to a heat treatment under no tension.

8. The method for producing a moistureproof multilayer film as recited in claim 5, wherein, in step (1), the multilayer film is prepared using a urethane-based adhesive, and wherein the heat treatment of step (2) is performed after subjecting the multilayer film to an aging treatment for the adhesive at a temperature in the range of 30–50° C. for at least 24 hours.

9. The method for producing a moistureproof multilayer film as recited in claim 4, wherein, in step (1), the multilayer film including a plurality of the composite films is prepared.

10. The method for producing a moistureproof multilayer film as recited in claim 9, wherein, in step (1), the multilayer film is prepared which includes a plurality of the composite films and which has such a layer structure that at least two of the composite films are laminated through an adhesive layer with the vapor deposited films thereof facing each other.

11. The method for producing a moistureproof multilayer film as recited in claim 10, wherein, in step (1), the multilayer film is prepared using a urethane-based adhesive, and wherein the heat treatment of step (2) is performed after subjecting the multilayer film to an aging treatment for the adhesive at a temperature in the range of 30–50° C. for at least 24 hours.

12. The method for producing a moistureproof multilayer film as recited in claim 9, wherein, in step (2), the multilayer film is subjected to a heat treatment under no tension.

13. The method for producing a moistureproof multilayer film as recited in claim 9, wherein, in step (1), the multilayer film is prepared using a urethane-based adhesive, and wherein the heat treatment of step (2) is performed after subjecting the multilayer film to an aging treatment for the adhesive at a temperature in the range of 30–50° C. for at least 24 hours.

14. The method for producing a moistureproof multilayer film as recited in claim 4, wherein, in step (2), the multilayer film is subjected to a heat treatment under no tension.

15. The method for producing a moistureproof multilayer film as recited in claim 14, wherein the multilayer film is subjected to a heat treatment in a rolled-up state.

16. The method for producing a moistureproof multilayer film as recited in claim 15, wherein, in step (1), the multilayer film is prepared using a urethane-based adhesive, and wherein the heat treatment of step (2) is performed after subjecting the multilayer film to an aging treatment for the adhesive at a temperature in the range of 30–50° C. for at least 24 hours.

17. The method for producing a moistureproof multilayer film as recited in claim 14, wherein, in step (2), the multilayer film is subjected to a heat treatment under no tension.

18. The method for producing a moistureproof multilayer film as recited in claim 14, wherein, in step (1), the multilayer film is prepared using a urethane-based adhesive, and wherein the heat treatment of step (2) is performed after subjecting the multilayer film to an aging treatment for the adhesive at a temperature in the range of 30–50° C. for at least 24 hours.

19. The method for producing a moistureproof multilayer film as recited in claim 4, wherein, in step (1), the multilayer film is prepared using a urethane-based adhesive, and wherein the heat treatment of step (2) is performed after subjecting the multilayer film to an aging treatment for the adhesive at a temperature in the range of 30–50° C. for at least 24 hours.

* * * * *